US009307166B2

(12) United States Patent
Sarkar et al.

(10) Patent No.: US 9,307,166 B2
(45) Date of Patent: Apr. 5, 2016

(54) ALL-IN-FOCUS IMPLEMENTATION

(71) Applicant: Intel Corporation, Santa Clara, CA (US)

(72) Inventors: Soumyendu Sarkar, Fremont, CA (US); Geoffrey Francis Burns, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/225,866

(22) Filed: Mar. 26, 2014

(65) Prior Publication Data

US 2015/0281592 A1    Oct. 1, 2015

(51) Int. Cl.
*H04N 5/265* (2006.01)
*H04N 5/232* (2006.01)
*H04N 5/235* (2006.01)

(52) U.S. Cl.
CPC ........... *H04N 5/265* (2013.01); *H04N 5/23232* (2013.01); *H04N 5/2356* (2013.01)

(58) Field of Classification Search
CPC .......... H04N 2101/00; H04N 5/23232; H04N 5/23212; H04N 5/2356; H04N 5/265
See application file for complete search history.

(56) References Cited

U.S. PATENT DOCUMENTS

| 8,830,380 | B2* | 9/2014 | Spielberg | ............. H04N 5/2356 348/345 |
| 2006/0061678 | A1* | 3/2006 | Yamazaki | .......... H04N 5/23212 348/349 |
| 2014/0002712 | A1* | 1/2014 | Spielberg | ...................... 348/345 |

FOREIGN PATENT DOCUMENTS

| DE | 102015102681 A1 | 10/2015 |
| JP | 2006086952 A | 3/2006 |
| JP | 2010139890 A | 6/2010 |
| JP | 5094070 B2 | 12/2012 |
| JP | 2015201837 A | 11/2015 |

OTHER PUBLICATIONS

Korean Application Serial No. 10-2015-0026782, Office Action mailed Nov. 17, 2012, W/ English Translation, 11 pgs.
Korean Application Serial No. 10-2015-0026782, Response filed Jan. 15, 2016 to Office Action mailed Nov. 17, 2015, W/ English Claims, 17 pgs.

* cited by examiner

*Primary Examiner* — Ahmed A Berhan
(74) *Attorney, Agent, or Firm* — Schwegman Lundberg & Woessner, P.A.

(57) ABSTRACT

Various systems and methods for an all-in-focus implementation are described herein. A system to for operating a camera, comprising an image sensor in the camera to capture a sequence of images in different focal planes, at least a portion of the sequence of images occurring before receiving a signal to store an all-in-focus image, a user interface module to receive, from a user, the signal to store an all-in-focus image, and an image processor to fuse at least two images to result in the all-in-focus image, wherein the at least two images have different focal planes.

22 Claims, 4 Drawing Sheets

| IMAGE FRAME | 0 | 1 | 2 | 3 | 4 | 5 | 6 | 7 |
|---|---|---|---|---|---|---|---|---|
| FOCUS OF SENSOR IMAGE CAPTURES | BASE | FAR | NEAR | BASE | FAR | NEAR | BASE | FAR |
| ALL-IN-FOCUS IMAGES AT 1 FRAME INTERVALS | | AIF AT IMAGE FRAME 1 – FUSE IMAGE FRAMES 0, 1, AND 2 | AIF AT IMAGE FRAME 2 – FUSE IMAGE FRAMES 1, 2, AND 3 | AIF AT IMAGE FRAME 3 – FUSE IMAGE FRAMES 2, 3, AND 4 | AIF AT IMAGE FRAME 4 – FUSE IMAGE FRAMES 3, 4, AND 5 | AIF AT IMAGE FRAME 5 – FUSE IMAGE FRAMES 4, 5, AND 6 | AIF AT IMAGE FRAME 6 – FUSE IMAGE FRAMES 5, 6, AND 7 | ... |
| AUTOFOCUS PROCESSING | YES | X | X | YES | X | X | YES | X |
| PREVIEW PROCESSING | YES | NO | NO | YES | NO | NO | YES | NO |

*FIG. 2*

| IMAGE FRAME | 0 | 1 | 2 | 3 | 4 | 5 | 6 | 7 | 8 | 9 | |
|---|---|---|---|---|---|---|---|---|---|---|---|
| FOCUS OF SENSOR IMAGE CAPTURES | BASE | FAR | BASE | NEAR | BASE | FAR | BASE | NEAR | BASE | FAR | — 304 |
| ALL-IN-FOCUS IMAGES AT 1 FRAME INTERVALS | | | AIF AT IMAGE FRAME 2 – FUSE IMAGE FRAMES 1, 2, AND 3 | | AIF AT IMAGE FRAME 4 – FUSE IMAGE FRAMES 3, 4, AND 5 | | AIF AT IMAGE FRAME 6 – FUSE IMAGE FRAMES 5, 6, AND 7 | | AIF AT IMAGE FRAME 8 – FUSE IMAGE FRAMES 7, 8, AND 9 | ••• | |
| AUTOFOCUS PROCESSING | YES | NO | YES | NO | YES | NO | YES | NO | | | — 310 |
| PREVIEW PROCESSING | YES | NO | YES | NO | YES | NO | YES | NO | | | — 312 |

*FIG. 3*

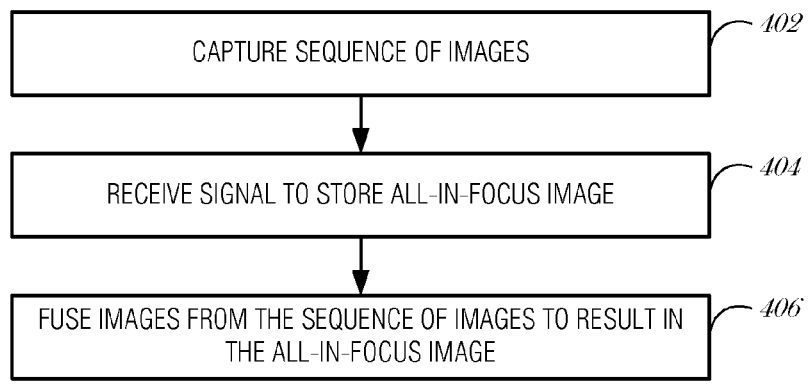

*FIG. 4*

ALL-IN-FOCUS IMPLEMENTATION

TECHNICAL FIELD

Embodiments described herein generally relate to photography and in particular, to an all-in-focus implementation.

BACKGROUND

In photography and cinematography depth of field (DOF) refers to the front-to-back range of focus in an image. In a picture with a large DOF, the foreground, middle, and background are all in focus. Conversely, a picture with a shallow DOF may only have one plane in focus. In conventional cameras, a large DOF may be achieved with a small camera aperture. In some digital cameras, several planes of focus may be captured in quick succession and combined to produce an all-in-focus image.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is a table illustrating a frame sequence, according to an embodiment;

FIG. 3 is a table illustrating a frame sequence, according to an embodiment

FIG. 4 is a flowchart illustrating a method for operating a camera, according to an embodiment.

DETAILED DESCRIPTION

All-in-focus images are created by fusing multiple images at different focal planes to obtain a resultant image that is largely, if not completely, in focus. The technique is also referred to as focus stacking, focal plane merging, or z-stacking. The fusion of images from different focal planes is performed by an image processor through image analysis. For example, using edge detection, various corresponding portions of images from different focal planes may be compared and the most in-focus portion is then used in the resultant image.

In conventional cameras, a delay exists between when the photographer actuates the shutter mechanism and when the image is captured. This delay is magnified for all-in-focus photography. When a photographer actuates the shutter release, conventional cameras capture multiple images and then combine them to create an all-in-focus image. Additionally, because of the delay, what the photographer was viewing on the electronic viewfinder is not consistent with the actual image captured. The present disclosure describes systems and methods to provide an optimized viewfinder and zero shutter lag for all-in-focus images. The systems and methods described herein work with autofocus implementations.

Figure 1:
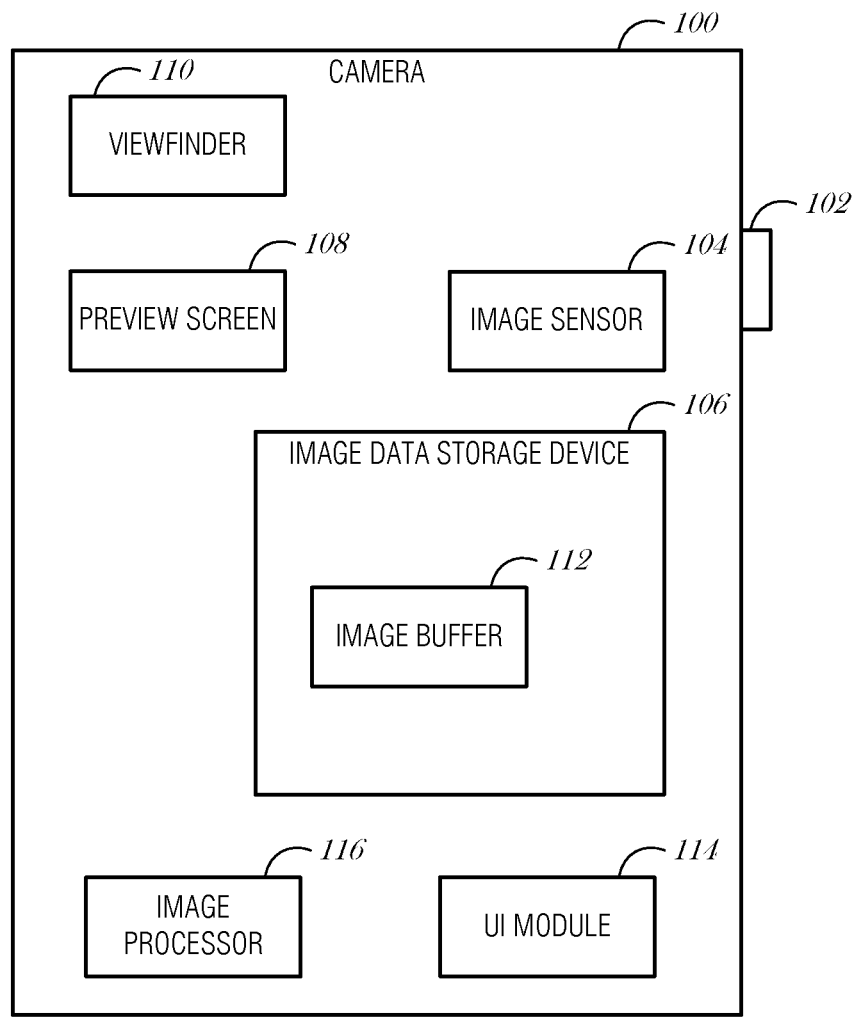
FIG. 1 is a block diagram illustrating a camera, according to an example embodiment.

FIG. 1 is a block diagram illustrating a camera 100, according to an example embodiment. The camera 100 includes a lens 102, an image sensor 104, an image data storage device 106, a preview screen 108, and an electronic viewfinder 110. The lens 102 operates to focus light onto the image sensor 104. The image sensor 104 may be any type of image sensor, including a charge-coupled device (CCD), a complementary metal-oxide-semiconductor (CMOS), or an N-type metal-oxide-semiconductor (NMOS) device. In a CCD sensor, pixels are represented by p-doped MOS capacitors. A capacitor array acts as a photoactive region, causing each capacitor to accumulate an electric charge proportional to the light intensity. The charges are converted to voltages as the array is dumped. The voltages are then sampled, digitized, and stored in memory. A CMOS active-pixel sensor is an integrated circuit containing an array of pixel sensors, each pixel containing a photodetector and an active amplifier.

The image storage device 106 may be any type of built-in or removable memory, such as a random-access memory (RAM), CompactFlash memory, Secure Digital memory, hard drive, flash drive, or other flash memory data storage device. When an image is taken, the image is stored at least temporarily in the image storage device.

In many forms, the preview screen 108 is used to temporarily display an image just after it is taken. The preview screen 108 may be relatively large compared to the size of the camera body. For example, the preview screen 108 may occupy a majority of the back panel of a camera body. The preview images displayed on the preview screen allow the user (photographer) to quickly review an image and take additional steps, such as to delete the image if it was undesirable, take another image, or use in-camera processing to modify the image with filters, cropping, zoom or the like. The electronic viewfinder 110 is used by the user to frame and compose the scene before trigging the image capture process. The electronic viewfinder 110 may be arranged in a conventional position on the camera 100, such as at the top of the camera body, and include a hood or other housing to shade the electronic viewfinder's image from ambient light. In some cases, the electronic viewfinder 110 is incorporated into the preview screen 108 such that the preview screen is used as a live preview of the scene. In some mobile devices, such as mobile phones, tablets, or smart phones, the electronic viewfinder 110 and the preview screen 108 are one and the same. This organization requires a high FPS update on the preview screen to ensure a smooth viewfinder image.

The image data storage device 106 may include an image buffer 112. During operation, the image buffer 112 is used to store a circular buffer of images that are continually captured by the image sensor 104. Images may be captured from the image sensor 104 at a frame rate. The frame rate may be constrained or designed according to the capabilities of the image sensor 104, image data storage device 106, image processor 116, or other components of the camera 100. The frame rate may be 30 frames per second (FPS), 24 FPS, 45 FPS, 60 FPS, or any other frame rate. As the user frames a scene (e.g., via partially depressing a shutter release or simply pointing at an object), the camera 100 continually captures images and stored them in the image buffer 112. When the user triggers an image capture (e.g., presses a shutter release), several images are retrieved from the image buffer 112 and used to assemble an all-in-focus image. Additionally, while the user is framing a scene, the electronic viewfinder 110 and/or the preview screen 108 are updated with a focused image (e.g., an autofocused image) that may be retrieved from the image buffer 112.

The image buffer 112 may be arranged in one of several ways to improve processing time for all-in-focus images and improve or eliminate image lag in the electronic viewfinder 110 or the preview screen 108. In an embodiment, a series of images are continually captured by the image sensor 104 and stored in the image buffer 112. The series may include a repeating pattern of three differentially focused images in the order of an image with an autofocused base focus, an image with a focus plan farther, and an image with a focus plane nearer. The sequence may be extended to have five or more differentially exposed images instead of three. For example, the sequence may be a base focus image, a far image, a farther image, a near image, and a nearer image. With this design, the all-in-focus image may be obtained with minimal processing lag.

FIG. 2 is a table 200 illustrating a frame sequence, according to an embodiment. In the first row 202, a series of frames periods is illustrated. The relative focal distance is shown in the second row 204. In the third through fifth rows 206, 208, and 210, the all-in-focus image fusion is illustrated. In the sixth row 212, an indication of whether autofocus processing is used during a particular image frame is illustrated. In the seventh row 214, an indication of whether preview processing is used during a particular image frame is illustrated.

As shown in the table 200, all-in-focus processing may be done for frame period 1 by performing multiframe image fusion with images captured at frame periods 0, 1 and 2. Similarly all-in-focus processing may be done for frame period 2 by performing multiframe image fusion with images captured at frame periods 1, 2 and 3. In this way, all-in-focus images may be processed for every frame period.

The zero shutter lag feature is therefore supported with a single frame period granularity. A user is able to navigate back into frame history in steps of single frame periods. The time nudge feature, which enables the user to access images from a time before the shutter was pressed, may be implemented with a single frame granularity as well. To facilitate time nudge, the preprocessing may be performed on the captured frames to provide the user better clarity on differentially focused images.

However, the organization illustrated in FIG. 2 may suffer from a lower FPS for the preview pane of one third of the capture FPS, as every third image frame is exposed with the base focus derived from autofocus. The near and far focused image frames are unsuitable for preview because the target object of the image is purposefully out of focus. Also, the autofocus processing and speed of convergence for autofocus may suffer as only every third image frame uses autofocus, thereby making autofocus more challenging.

FIG. 3 is a table 300 illustrating a frame sequence, according to an embodiment. In the first row 302, a series of frames periods is illustrated. The relative focal distance is shown in the second row 304. In the third and fourth rows 306 and 308, the all-in-focus image fusion is illustrated. In the fifth row 310, an indication of whether autofocus processing is used during a particular image frame is illustrated. In the sixth row 312, an indication of whether preview processing is used during a particular image frame is illustrated.

To optimize the preview and autofocus performance, a modified organization from that described above with respect to FIG. 2 is here described. The focus values for continuous capture are varied such that every four successive image captures are focused as base (auto) focus capture, far focus capture, again base (auto) focus capture, and near focus capture. The cycle repeats. Autofocus is computed on the image capture with base focus. Similar to the organization of FIG. 2, the preview for the viewfinder is processed on the image capture with base (auto) focus.

As shown in the table 300, all-in-focus processing is performed for frame period 2 by performing multiframe image fusion with images captured at frame periods 1, 2 and 3. Similarly, all-in-focus processing is performed for frame period 4 by performing multiframe image fusion with images captured at frame periods 3, 4 and 5. In this manner, an all-in-focus processed image is available for every two frame periods.

As a result, the zero shutter lag feature is supported with a two-frame period granularity as the user is able to step back two frames at a time. The time nudge feature is implemented in two-frame periods as well.

Because the image with base autofocus is available every 2nd frame instead of every 3rd frame (e.g., in FIG. 2), autofocus and preview processing for the viewfinder 110 or preview screen 108 may be done every other frame, or at half of the FPS of image capture. Autofocus convergence is significantly faster than the organization illustrated in FIG. 2 with single frame time granularity, making the user experience better with faster camera response and hence a higher quality all-in-focus with autofocus as base focus. As the preview FPS is just half of the camera capture FPS, the viewfinder imaging is smooth, enhancing user experience. As the autofocus convergence is significantly faster than the organization illustrated in FIG. 2 with single-frame time granularity, the resulting adaptive all-in-focus image is also of higher quality by tracking the base focus more accurately and focusing faster when the change in field of view results in a change in focus.

The systems and methods described herein enhance the user experience by removing or reducing the time delays and enable the user to capture an all-in-focus image at or closer to the moment of the shutter release. This mechanism is referred to as a zero shutter lag.

In addition, with the image buffer 112, a user is able to navigate back in time for a short period and assemble an all-in-focus image based on an image from the image buffer 112. As noted above, this mechanism is referred to as a time nudge.

The systems and method described herein are adaptive. Using the autofocus estimated focus plane as the base and taking other component still image captures at differentiated focus planes relative to the autofocus estimated image frame allows the system to be adaptive and adjust to the autofocus focus plane.

Returning to FIG. 1, FIG. 1 illustrates a system for operating a camera 100, the system comprising: an image sensor 104 in the camera 100 to capture a sequence of images in different focal planes, at least a portion of the sequence of images occurring before receiving a signal to store an all-in-focus image; a user interface module 114 to receive, from a user, the signal to store an all-in-focus image; and an image processor 116 to fuse at least two images to result in the all-in-focus image, wherein the at least two images have different focal planes.

In an embodiment, to capture the sequence of images, the image sensor 104 is to capture the sequence of images at a number of frames per second. In various embodiments, the number of frames per second is one of: 24 frames per second, 30 frames per second, 45 frames per second, or 60 frames per second.

In an embodiment, to receive the signal to store the all-in-focus image, the user interface module 114 is to receive a command to store the all-in-focus image at a time frame in the sequence of images. To fuse the at least two images to result in the all-in-focus image, the image processor 116 is to select the at least two images from the sequence of images at the time frame.

In an embodiment, receiving the signal to store the all-in-focus image occurs at a first time, and the image processor 116 is to: estimate a second time, the second time occurring before the first time and the second time representing when the user intended to store the all-in-focus image and fuse the at least two images to result in the all-in-focus image by selecting the at least two images from the sequence of images at the second time.

In an embodiment, to estimate the second time, the image processor 116 is to: identify a reaction time of the user; and subtract the reaction time from the first time to derive the second time.

In an embodiment, the sequence of images in different focal planes comprises a repeating series of images with a base focal plane, a far focal plane, and a near focal plane.

In an embodiment, to fuse at least two images to result in the all-in-focus image, the image processor 116 is to: select three successive images from the sequence of images, the three successive images including an image with a base focal plane, an image with a far focal plane, and an image with a near focal plane; and fuse the focused portions of the images to result in the all-in-focus image. In an embodiment, the base focal plane is an autofocus estimated focal plane.

In an embodiment, the sequence of images in different focal planes comprises a repeating series of images with a base focal plane, a far focal plane, the base focal plane, and a near focal plane.

In an embodiment, to fuse at least two images to result in the all-in-focus image, image processor 116 is to: select three successive images from the sequence of images, the three successive images including an image with a base focal plane, an image with a far focal plane, and an image with a near focal plane; and fuse the focused portions of the images to result in the all-in-focus image.

In an embodiment, to fuse at least two images to result in the all-in-focus image, the image processor 116 is to: select an image with the far focal plane from the sequence of images; select an image with the base focal plane from the sequence of images, the image with the base focal plane immediately successive to the image with the far focal plane; select an image with the near focal plane from the sequence of images, the image with the near focal plane immediately successive to the image with the base focal plane; and fuse the focused portions of the images with the far, base, and near focal planes to result in the all-in-focus image.

In an embodiment, to fuse at least two images to result in the all-in-focus image, the image processor 116 is to: select an image with the near focal plane from the sequence of images; select an image with the base focal plane from the sequence of images, the image with the base focal plane immediately successive to the image with the near focal plane; select an image with the far focal plane from the sequence of images, the image with the near focal plane immediately successive to the image with the base focal plane; and fuse the focused portions of the images with the near, base, and far focal planes to result in the all-in-focus image.

In an embodiment, the user interface module 114 is to present an electronic viewfinder image with an image selected from the sequence of images.

FIG. 4 is a flowchart illustrating a method 400 for operating a camera, according to an embodiment. At 402, a sequence of images in different focal planes is captured using an image sensor in the camera, where at least a portion of the sequence of images occurring before receiving a signal to store an all-in-focus image.

In an embodiment, capturing the sequence of images comprises capturing the sequence of images at a number of frames per second. In various embodiments, the number of frames per second is one of: 24 frames per second, 30 frames per second, 45 frames per second, or 60 frames per second.

In an embodiment, the sequence of images in different focal planes comprises a repeating series of images with a base focal plane, a far focal plane, and a near focal plane. In an embodiment, fusing at least two images to result in the all-in-focus image comprises: selecting three successive images from the sequence of images, the three successive images including an image with a base focal plane, an image with a far focal plane, and an image with a near focal plane; and fusing the focused portions of the images to result in the all-in-focus image. In an embodiment, the base focal plane is an autofocus estimated focal plane.

In an embodiment, the sequence of images in different focal planes comprises a repeating series of images with a base focal plane, a far focal plane, the base focal plane, and a near focal plane. In an embodiment, fusing at least two images to result in the all-in-focus image comprises: selecting three successive images from the sequence of images, the three successive images including an image with a base focal plane, an image with a far focal plane, and an image with a near focal plane; and fusing the focused portions of the images to result in the all-in-focus image.

In an embodiment, fusing at least two images to result in the all-in-focus image comprises: selecting an image with the far focal plane from the sequence of images; selecting an image with the base focal plane from the sequence of images, the image with the base focal plane immediately successive to the image with the far focal plane; selecting an image with the near focal plane from the sequence of images, the image with the near focal plane immediately successive to the image with the base focal plane; and fusing the focused portions of the images with the far, base, and near focal planes to result in the all-in-focus image.

In an embodiment, fusing at least two images to result in the all-in-focus image comprises: selecting an image with the near focal plane from the sequence of images; selecting an image with the base focal plane from the sequence of images, the image with the base focal plane immediately successive to the image with the near focal plane; selecting an image with the far focal plane from the sequence of images, the image with the near focal plane immediately successive to the image with the base focal plane; and fusing the focused portions of the images with the near, base, and far focal planes to result in the all-in-focus image.

At 404, the signal to store an all-in-focus image is received from a user. The signal may be initiated by the user pressing a physical or virtual shutter release button, pressing the preview screen 108, using a remote shutter release, using a timed shutter release, or the like.

At 406, at least two images are fused using an image processor to result in the all-in-focus image, where the at least two images have different focal planes.

In an embodiment, receiving the signal to store the all-in-focus image comprises receiving a command to store the all-in-focus image at a time frame in the sequence of images and fusing the at least two images to result in the all-in-focus image comprises selecting the at least two images from the sequence of images at the time frame.

In an embodiment, receiving the signal to store the all-in-focus image occurs at a first time, and wherein the method comprises: estimating a second time, the second time occurring before the first time and the second time representing when the user intended to store the all-in-focus image; and fusing the at least two images to result in the all-in-focus image comprises selecting the at least two images from the sequence of images at the second time. In an embodiment, estimating the second time comprises: identifying a reaction time of the user; and subtracting the reaction time from the first time to derive the second time.

In an embodiment, the method 400 includes presenting an electronic viewfinder image with an image selected from the sequence of images. The image may be a base autofocused image from the image buffer 112, for example.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
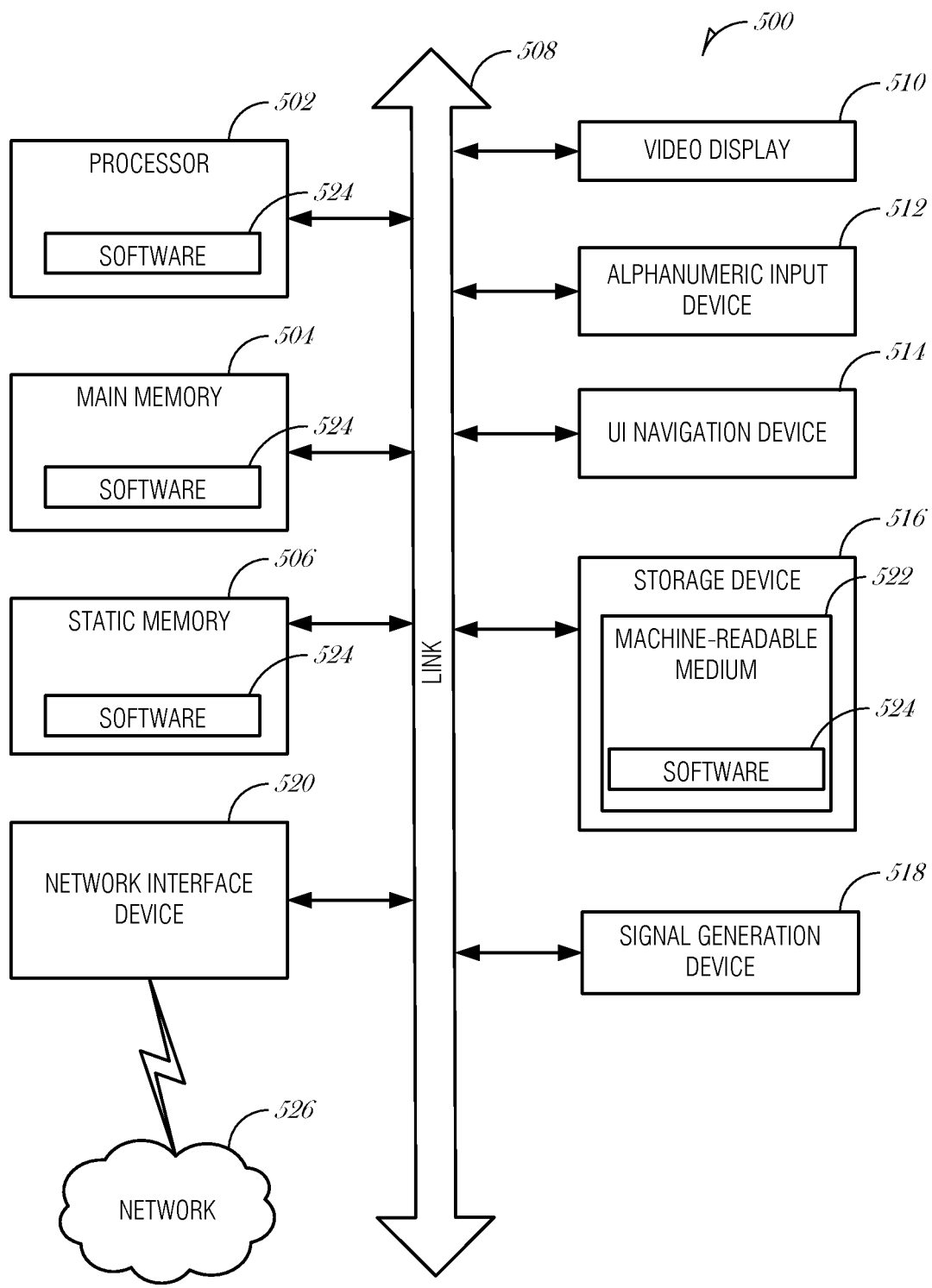
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for operating a camera (such as a device, apparatus, or machine) comprising a system comprising an image sensor in the camera to capture a sequence of images in different focal planes, at least a portion of the sequence of images occurring before receiving a signal to store an all-in-focus image; a user interface module to receive, from a user, the signal to store an all-in-focus image; and an image processor to fuse at least two images to result in the all-in-focus image, wherein the at least two images have different focal planes.

In Example 2, the subject matter of Example 1 may include, wherein to capture the sequence of images, the image sensor is to: capture the sequence of images at a number of frames per second.

In Example 3 the subject matter of any one or more of Examples 1 to 2 may include, wherein the number of frames per second is one of: 24 frames per second, 30 frames per second, 45 frames per second, or 60 frames per second.

In Example 4 the subject matter of any one or more of Examples 1 to 3 may include, wherein to receive the signal to store the all-in-focus image, the user interface module is to receive a command to store the all-in-focus image at a time frame in the sequence of images; and wherein to fuse the at least two images to result in the all-in-focus image, the image processor is to select the at least two images from the sequence of images at the time frame.

In Example 5 the subject matter of any one or more of Examples 1 to 4 may include, wherein the receiving the signal to store the all-in-focus image occurs at a first time, and wherein the image processor is to: estimate a second time, the second time occurring before the first time and the second time representing when the user intended to store the all-in-focus image; and fuse the at least two images to result in the all-in-focus image by selecting the at least two images from the sequence of images at the second time.

In Example 6 the subject matter of any one or more of Examples 1 to 5 may include, wherein to estimate the second time, the image processor is to: identify a reaction time of the user; and subtract the reaction time from the first time to derive the second time.

In Example 7 the subject matter of any one or more of Examples 1 to 6 may include, wherein the sequence of images in different focal planes comprises a repeating series of images with a base focal plane, a far focal plane, and a near focal plane.

In Example 8 the subject matter of any one or more of Examples 1 to 7 may include, wherein to fuse at least two images to result in the all-in-focus image, the image processor is to: select three successive images from the sequence of images, the three successive images including an image with the base focal plane, an image with the far focal plane, and an image with the near focal plane; and fuse the focused portions of the images to result in the all-in-focus image.

In Example 9 the subject matter of any one or more of Examples 1 to 8 may include, wherein the base focal plane is an autofocus estimated focal plane.

In Example 10 the subject matter of any one or more of Examples 1 to 9 may include, wherein the sequence of images in different focal planes comprises a repeating series of images with a base focal plane, a far focal plane, the base focal plane, and a near focal plane.

In Example 11 the subject matter of any one or more of Examples 1 to 10 may include, wherein to fuse at least two images to result in the all-in-focus image, image processor is to: select three successive images from the sequence of images, the three successive images including an image with the base focal plane, an image with the far focal plane, and an image with the near focal plane; and fuse the focused portions of the images to result in the all-in-focus image.

In Example 12 the subject matter of any one or more of Examples 1 to 11 may include, wherein to fuse at least two images to result in the all-in-focus image, the image processor is to: select an image with the far focal plane from the sequence of images; select an image with the base focal plane from the sequence of images, the image with the base focal plane immediately successive to the image with the far focal plane; select an image with the near focal plane from the sequence of images, the image with the near focal plane immediately successive to the image with the base focal plane; and fuse the focused portions of the images with the far, base, and near focal planes to result in the all-in-focus image.

In Example 13 the subject matter of any one or more of Examples 1 to 12 may include, wherein to fuse at least two images to result in the all-in-focus image, the image processor is to: select an image with the near focal plane from the sequence of images; select an image with the base focal plane from the sequence of images, the image with the base focal plane immediately successive to the image with the near focal plane; select an image with the far focal plane from the sequence of images, the image with the near focal plane immediately successive to the image with the base focal plane; and fuse the focused portions of the images with the near, base, and far focal planes to result in the all-in-focus image.

In Example 14 the subject matter of any one or more of Examples 1 to 13 may include, wherein the user interface module is to present an electronic viewfinder image with an image selected from the sequence of images.

Example 15 includes subject matter for operating a camera (such as a method, means for performing acts, machine readable medium including instructions that when performed by a machine cause the machine to performs acts, or an apparatus configured to perform) comprising capturing, using an image sensor in the camera, a sequence of images in different focal planes, at least a portion of the sequence of images occurring before receiving a signal to store an all-in-focus image; receiving, from a user, the signal to store an all-in-focus image; and fusing, using an image processor, at least two images to result in the all-in-focus image, wherein the at least two images have different focal planes.

In Example 16, the subject matter of Example 15 may include, wherein capturing the sequence of images comprises: capturing the sequence of images at a number of frames per second.

In Example 17 the subject matter of any one or more of Examples 15 to 16 may include, wherein the number of frames per second is one of: 24 frames per second, 30 frames per second, 45 frames per second, or 60 frames per second.

In Example 18 the subject matter of any one or more of Examples 15 to 17 may include, wherein receiving the signal to store the all-in-focus image comprises receiving a command to store the all-in-focus image at a time frame in the sequence of images; and wherein fusing the at least two images to result in the all-in-focus image comprises selecting the at least two images from the sequence of images at the time frame.

In Example 19 the subject matter of any one or more of Examples 15 to 18 may include, wherein the receiving the signal to store the all-in-focus image occurs at a first time, and wherein the method comprises: estimating a second time, the second time occurring before the first time and the second time representing when the user intended to store the all-in-focus image; and wherein fusing the at least two images to result in the all-in-focus image comprises selecting the at least two images from the sequence of images at the second time.

In Example 20 the subject matter of any one or more of Examples 15 to 19 may include, wherein estimating the second time comprises: identifying a reaction time of the user; and subtracting the reaction time from the first time to derive the second time.

In Example 21 the subject matter of any one or more of Examples 15 to 20 may include, wherein the sequence of images in different focal planes comprises a repeating series of images with a base focal plane, a far focal plane, and a near focal plane.

In Example 22 the subject matter of any one or more of Examples 15 to 21 may include, wherein fusing at least two images to result in the all-in-focus image comprises: selecting three successive images from the sequence of images, the three successive images including an image with the base focal plane, an image with the far focal plane, and an image with the near focal plane; and fusing the focused portions of the images to result in the all-in-focus image.

In Example 23 the subject matter of any one or more of Examples 15 to 22 may include, wherein the base focal plane is an autofocus estimated focal plane.

In Example 24 the subject matter of any one or more of Examples 15 to 23 may include, wherein the sequence of images in different focal planes comprises a repeating series of images with a base focal plane, a far focal plane, the base focal plane, and a near focal plane.

In Example 25 the subject matter of any one or more of Examples 15 to 24 may include, wherein fusing at least two images to result in the all-in-focus image comprises: selecting three successive images from the sequence of images, the three successive images including an image with the base focal plane, an image with the far focal plane, and an image with the near focal plane; and fusing the focused portions of the images to result in the all-in-focus image.

In Example 26 the subject matter of any one or more of Examples 15 to 25 may include, wherein fusing at least two images to result in the all-in-focus image comprises: selecting an image with the far focal plane from the sequence of images; selecting an image with the base focal plane from the sequence of images, the image with the base focal plane immediately successive to the image with the far focal plane; selecting an image with the near focal plane from the sequence of images, the image with the near focal plane immediately successive to the image with the base focal plane; and fusing the focused portions of the images with the far, base, and near focal planes to result in the all-in-focus image.

In Example 27 the subject matter of any one or more of Examples 15 to 26 may include, wherein fusing at least two images to result in the all-in-focus image comprises: selecting an image with the near focal plane from the sequence of images; selecting an image with the base focal plane from the sequence of images, the image with the base focal plane immediately successive to the image with the near focal plane; selecting an image with the far focal plane from the sequence of images, the image with the near focal plane immediately successive to the image with the base focal plane; and fusing the focused portions of the images with the near, base, and far focal planes to result in the all-in-focus image.

In Example 28 the subject matter of any one or more of Examples 15 to 27 may include, presenting an electronic viewfinder image with an image selected from the sequence of images.

Example 29 includes a machine-readable medium including instructions, which when executed by a machine, cause the machine to perform operations of any one of the examples 1-28.

Example 30 includes an apparatus comprising means for performing any of the examples 1-28.

Example 31 includes an apparatus comprising: means for capturing, using an image sensor in the camera, a sequence of images in different focal planes, at least a portion of the sequence of images occurring before receiving a signal to store an all-in-focus image; means for receiving, from a user, the signal to store an all-in-focus image; and means for fusing, using an image processor, at least two images to result in the all-in-focus image, wherein the at least two images have different focal planes.

In Example 32, the subject matter of Example 30 may include, wherein capturing the sequence of images comprises: capturing the sequence of images at a number of frames per second.

In Example 33 the subject matter of any one or more of Examples 30 to 32 may include, wherein the number of frames per second is one of: 24 frames per second, 30 frames per second, 45 frames per second, or 60 frames per second.

In Example 34 the subject matter of any one or more of Examples 30 to 33 may include, wherein the means for receiving the signal to store the all-in-focus image comprises means for receiving a command to store the all-in-focus image at a time frame in the sequence of images; and wherein the means for fusing the at least two images to result in the all-in-focus image comprises means for selecting the at least two images from the sequence of images at the time frame.

In Example 35 the subject matter of any one or more of Examples 30 to 34 may include, wherein the receiving the signal to store the all-in-focus image occurs at a first time, and wherein the apparatus comprises: means for estimating a second time, the second time occurring before the first time and the second time representing when the user intended to store the all-in-focus image; and wherein the means for fusing the at least two images to result in the all-in-focus image comprises means for selecting the at least two images from the sequence of images at the second time.

In Example 36 the subject matter of any one or more of Examples 30 to 35 may include, wherein the means for estimating the second time comprises: means for identifying a reaction time of the user; and means for subtracting the reaction time from the first time to derive the second time.

In Example 37 the subject matter of any one or more of Examples 30 to 36 may include, wherein the sequence of images in different focal planes comprises a repeating series of images with a base focal plane, a far focal plane, and a near focal plane.

In Example 38 the subject matter of any one or more of Examples 30 to 37 may include, wherein the means for fusing at least two images to result in the all-in-focus image comprises: means for selecting three successive images from the sequence of images, the three successive images including an image with the base focal plane, an image with the far focal plane, and an image with the near focal plane; and means for fusing the focused portions of the images to result in the all-in-focus image.

In Example 39 the subject matter of any one or more of Examples 30 to 38 may include, wherein the base focal plane is an autofocus estimated focal plane.

In Example 40 the subject matter of any one or more of Examples 30 to 39 may include, wherein the sequence of images in different focal planes comprises a repeating series of images with a base focal plane, a far focal plane, the base focal plane, and a near focal plane.

In Example 41 the subject matter of any one or more of Examples 30 to 39 may include, wherein the means for fusing at least two images to result in the all-in-focus image comprises: means for selecting three successive images from the sequence of images, the three successive images including an image with the base focal plane, an image with the far focal plane, and an image with the near focal plane; and means for fusing the focused portions of the images to result in the all-in-focus image.

In Example 42 the subject matter of any one or more of Examples 30 to 41 may include, wherein the means for fusing at least two images to result in the all-in-focus image comprises: means for selecting an image with the far focal plane from the sequence of images; means for selecting an image with the base focal plane from the sequence of images, the image with the base focal plane immediately successive to the image with the far focal plane; means for selecting an image with the near focal plane from the sequence of images, the image with the near focal plane immediately successive to the image with the base focal plane; and means for fusing the focused portions of the images with the far, base, and near focal planes to result in the all-in-focus image.

In Example 43 the subject matter of any one or more of Examples 30 to 42 may include, wherein the means for fusing at least two images to result in the all-in-focus image comprises: means for selecting an image with the near focal plane from the sequence of images; means for selecting an image with the base focal plane from the sequence of images, the image with the base focal plane immediately successive to the image with the near focal plane; means for selecting an image with the far focal plane from the sequence of images, the image with the near focal plane immediately successive to the image with the base focal plane; and means for fusing the focused portions of the images with the near, base, and far focal planes to result in the all-in-focus image.

In Example 44 the subject matter of any one or more of Examples 30 to 43 may include, means for presenting an electronic viewfinder image with an image selected from the sequence of images.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for operating a camera, the system comprising:
   an image sensor in the camera to capture a sequence of images in different focal planes, at least a portion of the sequence of images occurring before receiving a signal to store an all-in-focus image;
   a user interface module to receive, from a user, the signal to store an all-in-focus image; and
   an image processor to fuse at least two images to result in the all-in-focus image, wherein the at least two images have different focal planes,
   wherein receiving the signal to store the all-in-focus image occurs at a first time, and wherein the image processor is to:
      estimate a second time, the second time occurring before the first time and the second time representing when the user intended to store the all-in-focus image; and
      fuse the at least two images to result in the all-in-focus image by selecting the at least two images from the sequence of images at the second time.

2. The system of claim 1, wherein to capture the sequence of images, the image sensor is to:
capture the sequence of images at a number of frames per second.

3. The system of claim 2, wherein the number of frames per second is one of: 24 frames per second, 30 frames per second, 45 frames per second, or 60 frames per second.

4. The system of claim 1, wherein to receive the signal to store the all-in-focus image, the user interface module is to receive a command to store the all-in-focus image at a time frame in the sequence of images; and
wherein to fuse the at least two images to result in the all-in-focus image, the image processor is to select the at least two images from the sequence of images at the time frame.

5. The system of claim 1, wherein to estimate the second time, the image processor is to:
identify a reaction time of the user; and
subtract the reaction time from the first time to derive the second time.

6. The system of claim 1, wherein the sequence of images in different focal planes comprises a repeating series of images with a base focal plane, a far focal plane, and a near focal plane.

7. The system of claim 6, wherein to fuse at least two images to result in the all-in-focus image, the image processor is to:
select three successive images from the sequence of images, the three successive images including an image with the base focal plane, an image with the far focal plane, and an image with the near focal plane; and
fuse the focused portions of the images to result in the all-in-focus image.

8. The system of claim 7, wherein the base focal plane is an autofocus estimated focal plane.

9. The system of claim 1, wherein the sequence of images in different focal planes comprises a repeating series of images with a base focal plane, a far focal plane, the base focal plane, and a near focal plane.

10. The system of claim 9, wherein to fuse at least two images to result in the all-in-focus image, image processor is to:
select three successive images from the sequence of images, the three successive images including an image with the base focal plane, an image with the far focal plane, and an image with the near focal plane; and
fuse the focused portions of the images to result in the all-in-focus image.

11. The system of claim 9, wherein to fuse at least two images to result in the all-in-focus image, the image processor is to:
select an image with the far focal plane from the sequence of images;
select an image with the base focal plane from the sequence of images, the image with the base focal plane immediately successive to the image with the far focal plane;
select an image with the near focal plane from the sequence of images, the image with the near focal plane immediately successive to the image with the base focal plane; and
fuse the focused portions of the images with the far, base, and near focal planes to result in the all-in-focus image.

12. The system of claim 9, wherein to fuse at least two images to result in the all-in-focus image, the image processor is to:
select an image with the near focal plane from the sequence of images;
select an image with the base focal plane from the sequence of images, the image with the base focal plane immediately successive to the image with the near focal plane;
select an image with the far focal plane from the sequence of images, the image with the near focal plane immediately successive to the image with the base focal plane; and
fuse the focused portions of the images with the near, base, and far focal planes to result in the all-in-focus image.

13. The system of claim 1, wherein the user interface module is to present an electronic viewfinder image with an image selected from the sequence of images.

14. A method for operating a camera, the method comprising:
capturing, using an image sensor in the camera, a sequence of images in different focal planes, at least a portion of the sequence of images occurring before receiving a signal to store an all-in-focus image;
receiving, from a user, the signal to store an all-in-focus image; and
fusing, using an image processor, at least two images to result in the all-in-focus image, wherein the at least two images have different focal planes,
wherein receiving the signal to store the all-in-focus image occurs at a first time, and wherein the method comprises estimating a second time, the second time occurring before the first time and the second time representing when the user intended to store the all-in-focus image; and
wherein fusing the at least two images to result in the all-in-focus image comprises selecting the at least two images from the sequence of images at the second time.

15. The method of claim 14, wherein capturing the sequence of images comprises:
capturing the sequence of images at a number of frames per second.

16. The method of claim 15, wherein the number of frames per second is one of: 24 frames per second, 30 frames per second, 45 frames per second, or 60 frames per second.

17. The method of claim 14, wherein receiving the signal to store the all-in-focus image comprises receiving a command to store the all-in-focus image at a time frame in the sequence of images; and
wherein fusing the at least two images to result in the all-in-focus image comprises selecting the at least two images from the sequence of images at the time frame.

18. The method of claim 14, wherein estimating the second time comprises:
identifying a reaction time of the user; and
subtracting the reaction time from the first time to derive the second time.

19. A non-transitory machine-readable medium including instructions for operating a camera, which when executed by a machine, cause the machine to perform operations comprising:
capturing, using an image sensor in the camera, a sequence of images in different focal planes, at least a portion of the sequence of images occurring before receiving a signal to store an all-in-focus image;
receiving, from a user, the signal to store an all-in-focus image; and
fusing, using an image processor, at least two images to result in the all-in-focus image, wherein the at least two images have different focal planes,
wherein receiving the signal to store the all-in-focus image occurs at a first time, and wherein the machine-readable medium comprises instructions to perform the operations comprising estimating a second time, the second time occurring before the first time and the second time representing when the user intended to store the all-in-focus image; and wherein fusing the at least two images to result in the all-in-focus image comprises selecting the at least two images from the sequence of images at the second time.

20. The non-transitory machine-readable medium of claim 19, wherein capturing the sequence of images comprises:

capturing the sequence of images at a number of frames per second.

21. The non-transitory machine-readable medium of claim 20, wherein the number of frames per second is one of: 24 frames per second, 30 frames per second, 45 frames per second, or 60 frames per second.

22. The non-transitory machine-readable medium of claim 19, wherein receiving the signal to store the all-in-focus image comprises receiving a command to store the all-in-focus image at a time frame in the sequence of images; and wherein fusing the at least two images to result in the all-in-focus image comprises selecting the at least two images from the sequence of images at the time frame.

\* \* \* \* \*